(12) United States Patent
Joshi et al.

(10) Patent No.: US 9,304,590 B2
(45) Date of Patent: *Apr. 5, 2016

(54) INTUITIVE THERMAL USER INTERFACE

(71) Applicant: Leeo, Inc., Palo Alto, CA (US)

(72) Inventors: Nina S. Joshi, Saratoga, CA (US); Bjorn H. Hovland, Woodside, CA (US); Aaron H. Squier, Palo Alto, CA (US); Andrew G. Stevens, Palo Alto, CA (US)

(73) Assignee: Leen, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,683

(22) Filed: Jun. 6, 2015

(65) Prior Publication Data
US 2016/0062462 A1    Mar. 3, 2016

Related U.S. Application Data

(63) Continuation of application No. 14/470,774, filed on Aug. 27, 2014, now Pat. No. 9,092,060.

(51) Int. Cl.
*G08B 6/00* (2006.01)
*G06F 3/01* (2006.01)

(52) U.S. Cl.
CPC .................................... *G06F 3/016* (2013.01)

(58) Field of Classification Search
None
See application file for complete search history.

(56) References Cited

U.S. PATENT DOCUMENTS

| | | |
|---|---|---|
| 900,595 A | 10/1908 | Sanders |
| 988,665 A | 4/1911 | Ripson |
| 3,030,806 A | 4/1962 | Merlin |
| 3,722,501 A | 3/1973 | Derouineau |
| 3,767,933 A | 10/1973 | Bogue |

(Continued)

FOREIGN PATENT DOCUMENTS

| | | |
|---|---|---|
| EP | 1500955 A1 | 1/2005 |
| GB | 2454731 A | 5/2009 |
| WO | WO-0133178 | 5/2001 |
| WO | WO-2005063006 | 7/2005 |
| WO | WO-2007148299 | 12/2007 |

OTHER PUBLICATIONS

Albea, "High Performance Control Design for Dynamic Voltage Scaling Devices", IEEE Transactions on Circuits and Systems, Part 1, Regular Papers 58, 12, Nov. 17, 2011, pp. 2919-2930.

(Continued)

*Primary Examiner* — Fekadeselassie Girma
*Assistant Examiner* — Chico A Foxx
(74) *Attorney, Agent, or Firm* — Steven Stupp; Hudak Consulting Group, LLC

(57) ABSTRACT

An electronic device that provides thermal feedback to a user is described. In particular, when the user provides a setting via tactile interaction with a surface of a user-interface device in the electronic device, a thermal mechanism in the electronic device establishes a temperature gradient on the surface based on the setting. For example, the thermal mechanism may include a heat source that increases a temperature of the portion of the user-interface device and/or a heat sink that decreases a temperature of another portion of the user-interface device. Moreover, the thermal mechanism may dynamically modify the temperature gradient based on the tactile interaction and an environmental condition (such as the temperature) in an external environment that includes the electronic device. Note that the tactile interaction with the user may occur with a physical control object (such as a knob) and/or with a virtual icon displayed on a multi-touch display.

20 Claims, 8 Drawing Sheets

(56) References Cited

U.S. PATENT DOCUMENTS

| | | |
|---|---|---|
| 3,895,638 A | 7/1975 | Ito |
| 4,093,867 A | 6/1978 | Shah |
| 4,286,470 A | 9/1981 | Lynnworth |
| 4,418,333 A | 11/1983 | Schwarzbach |
| 4,450,436 A | 5/1984 | Massa |
| 4,772,126 A | 9/1988 | Allemand |
| 4,812,827 A | 3/1989 | Scripps |
| 4,829,283 A | 5/1989 | Spang |
| 4,896,039 A | 1/1990 | Fraden |
| 4,896,136 A | 1/1990 | Hotovy |
| 4,984,380 A | 1/1991 | Anderson |
| 5,003,486 A | 3/1991 | Hendel |
| 5,045,833 A | 9/1991 | Smith |
| 5,068,715 A * | 11/1991 | Wade et al. .................. 257/720 |
| 5,156,203 A | 10/1992 | Funakoshi |
| 5,159,315 A | 10/1992 | Schultz |
| 5,185,531 A | 2/1993 | Wynn |
| 5,307,051 A | 4/1994 | Sedlmayr |
| 5,426,501 A | 6/1995 | Hokanson |
| 5,478,256 A | 12/1995 | Koganemaru |
| 5,492,482 A | 2/1996 | Lockman |
| 5,493,618 A | 2/1996 | Stevens |
| 5,532,660 A | 7/1996 | Smith |
| 5,578,995 A | 11/1996 | Bryant |
| 5,646,591 A | 7/1997 | Issa |
| 5,675,070 A | 10/1997 | Gelperin |
| 5,745,670 A | 4/1998 | Linde |
| 5,801,297 A | 9/1998 | Mifsud |
| 5,905,436 A | 5/1999 | Dwight et al. |
| 5,936,613 A * | 8/1999 | Jaeger et al. ................. 345/172 |
| 6,023,223 A | 2/2000 | Baxter |
| 6,023,233 A | 2/2000 | Craven |
| 6,074,089 A | 6/2000 | Hollander |
| 6,077,107 A | 6/2000 | Hetherington |
| 6,084,572 A | 7/2000 | Yaniger |
| 6,158,868 A | 12/2000 | Chien |
| 6,216,956 B1 | 4/2001 | Ehlers |
| 6,234,642 B1 | 5/2001 | Bokämper |
| 6,257,758 B1 | 7/2001 | Culbertson |
| 6,408,704 B1 | 6/2002 | Willeke |
| 6,415,205 B1 | 7/2002 | Myron |
| 6,428,334 B1 | 8/2002 | Skarie |
| 6,442,999 B1 | 9/2002 | Baumoel |
| 6,492,907 B1 | 12/2002 | Mccracken |
| 6,542,234 B1 | 4/2003 | Ulrich |
| 6,554,439 B1 | 4/2003 | Teicher |
| 6,615,147 B1 | 9/2003 | Jonker |
| 6,672,129 B1 | 1/2004 | Frederickson |
| 6,677,573 B1 | 1/2004 | Nakata |
| 6,741,177 B2 | 5/2004 | Ballantyne |
| 6,753,776 B2 | 6/2004 | Drinkard |
| 6,753,786 B1 | 6/2004 | Apperson |
| 6,759,763 B2 | 7/2004 | Barton |
| 6,772,052 B1 | 8/2004 | Amundsen |
| 6,828,909 B2 | 12/2004 | Script |
| 6,873,725 B2 | 3/2005 | Xu |
| 6,892,317 B1 | 5/2005 | Sampath et al. |
| 6,950,017 B2 | 9/2005 | Smith |
| 6,981,943 B2 | 1/2006 | Noguchi |
| 6,991,029 B2 | 1/2006 | Orfield |
| 7,038,398 B1 | 5/2006 | Lys |
| 7,049,968 B2 | 5/2006 | Fitzgerald |
| 7,089,780 B2 | 8/2006 | Sunshine |
| 7,098,782 B1 | 8/2006 | Peckham |
| 7,116,213 B2 | 10/2006 | Thiesen |
| 7,119,789 B1 * | 10/2006 | Shaw et al. .................. 345/156 |
| 7,155,317 B1 | 12/2006 | Tran |
| 7,166,796 B2 | 1/2007 | Nicolaou |
| 7,166,937 B2 | 1/2007 | Wilson |
| 7,227,652 B2 | 6/2007 | Cronch |
| 7,257,397 B2 | 8/2007 | Shamoon |
| 7,264,377 B2 | 9/2007 | Cooper |
| 7,287,738 B2 | 10/2007 | Pitlor |
| 7,304,129 B2 | 12/2007 | Saffell |
| 7,304,259 B2 | 12/2007 | Schwarz |
| 7,337,078 B2 | 2/2008 | Bond |
| RE40,437 E | 7/2008 | Rosen |
| 7,400,594 B2 | 7/2008 | Pereira |
| 7,405,524 B2 | 7/2008 | Null |
| 7,420,293 B2 | 9/2008 | Donnelly |
| 7,424,624 B2 | 9/2008 | Espinoza-Ibarra |
| 7,438,446 B1 | 10/2008 | Mccann |
| 7,492,273 B2 | 2/2009 | Sharpe |
| 7,502,199 B2 | 3/2009 | Hori |
| 7,515,041 B2 | 4/2009 | Eisold |
| 7,520,607 B2 | 4/2009 | Casper |
| 7,522,036 B1 | 4/2009 | Preuss |
| 7,649,472 B1 | 1/2010 | Paterno |
| 7,673,525 B2 | 3/2010 | Huang |
| 7,685,861 B2 | 3/2010 | Lynch |
| 7,710,824 B1 | 5/2010 | Katzer et al. |
| 7,764,180 B2 | 7/2010 | Huang |
| 7,784,293 B2 | 8/2010 | Violand |
| 7,786,879 B2 | 8/2010 | Lax |
| 7,818,184 B2 | 10/2010 | Penny |
| 7,825,546 B2 | 11/2010 | Li |
| 7,828,463 B1 | 11/2010 | Willis |
| 7,874,695 B2 | 1/2011 | Jensen |
| 7,905,154 B2 | 3/2011 | Jones |
| 7,908,211 B1 | 3/2011 | Chen et al. |
| 7,952,475 B2 | 5/2011 | Ivanov |
| 7,963,177 B2 | 6/2011 | Gysling |
| 7,992,332 B2 | 8/2011 | Lowenthal |
| 7,994,928 B2 | 8/2011 | Richmond |
| 8,018,327 B2 | 9/2011 | Nelson |
| 8,051,312 B2 | 11/2011 | Foley |
| 8,097,984 B2 | 1/2012 | Baarman |
| 8,113,069 B2 | 2/2012 | Settles |
| 8,125,194 B2 | 2/2012 | Nethken |
| 8,155,012 B2 | 4/2012 | Austermann |
| 8,170,722 B1 | 5/2012 | Elberbaum |
| 8,224,576 B2 | 7/2012 | Jensen |
| 8,242,640 B2 | 8/2012 | Lee |
| 8,255,090 B2 | 8/2012 | Frader-Thompson |
| 8,289,135 B2 | 10/2012 | Griffin |
| 8,301,271 B2 | 10/2012 | Lee |
| 8,314,590 B2 | 11/2012 | Chen |
| 8,335,936 B2 | 12/2012 | Jonsson |
| 8,350,406 B2 | 1/2013 | Byrne et al. |
| 8,369,135 B1 | 2/2013 | Mani |
| 8,451,132 B1 | 5/2013 | Van Vleet |
| 8,452,255 B2 | 5/2013 | Orth |
| 8,463,452 B2 | 6/2013 | Masters |
| 8,466,626 B2 | 6/2013 | Null |
| 8,475,367 B1 | 7/2013 | Yuen |
| 8,489,437 B1 | 7/2013 | Dlott |
| 8,493,618 B2 | 7/2013 | Ishii |
| 8,523,758 B1 | 9/2013 | Kirby |
| 8,543,247 B2 | 9/2013 | Boss |
| 8,564,403 B2 | 10/2013 | Landau-Holdsworth |
| 8,583,843 B2 | 11/2013 | Rosso |
| 8,605,091 B2 | 12/2013 | Bradbury |
| 8,610,587 B2 | 12/2013 | Tropper |
| 8,639,391 B1 | 1/2014 | Alberth |
| 8,683,236 B2 | 3/2014 | Ukita et al. |
| 8,730,004 B2 | 5/2014 | Elfstrom et al. |
| 8,823,529 B2 | 9/2014 | Reed |
| 8,897,804 B2 | 11/2014 | Couch |
| 9,064,394 B1 | 6/2015 | Trundle |
| 2001/0007800 A1 | 7/2001 | Skarie |
| 2002/0011947 A1 | 1/2002 | Stolarczyk |
| 2002/0037026 A1 | 3/2002 | Sato |
| 2002/0050932 A1 | 5/2002 | Rhoades |
| 2002/0069076 A1 | 6/2002 | Faris |
| 2002/0073138 A1 | 6/2002 | Gilbert |
| 2002/0097546 A1 | 7/2002 | Weinberger |
| 2002/0152037 A1 | 10/2002 | Sunshine |
| 2002/0170367 A1 | 11/2002 | Lieber |
| 2003/0028270 A1 * | 2/2003 | Peterson et al. ................. 700/83 |
| 2003/0074092 A1 | 4/2003 | Carrabis |
| 2003/0194904 A1 | 10/2003 | Rupert et al. |
| 2003/0227220 A1 | 12/2003 | Biskup |
| 2003/0227389 A1 | 12/2003 | McGreal |
| 2003/0231495 A1 | 12/2003 | Searfoss |

(56) References Cited

U.S. PATENT DOCUMENTS

| | | |
|---|---|---|
| 2004/0015572 A1 | 1/2004 | Kang |
| 2004/0025604 A1 | 2/2004 | Call |
| 2004/0030531 A1 | 2/2004 | Miller |
| 2004/0069046 A1 | 4/2004 | Sunshine |
| 2004/0075566 A1 | 4/2004 | Stepanik |
| 2004/0147038 A1 | 7/2004 | Lewis |
| 2004/0158193 A1 | 8/2004 | Bui |
| 2004/0215981 A1 | 10/2004 | Ricciardi |
| 2005/0045784 A1 | 3/2005 | Pitlor |
| 2005/0073405 A1 | 4/2005 | Spoltore |
| 2005/0111213 A1 | 5/2005 | Smith |
| 2005/0136972 A1 | 6/2005 | Smith |
| 2005/0148890 A1 | 7/2005 | Hastings |
| 2005/0229452 A1 | 10/2005 | Shimasaki |
| 2005/0276051 A1 | 12/2005 | Caudle |
| 2005/0289378 A1 | 12/2005 | Vorenkamp |
| 2006/0004492 A1 | 1/2006 | Terlson |
| 2006/0119954 A1 | 6/2006 | Casper |
| 2006/0173580 A1 | 8/2006 | Desrochers |
| 2006/0238757 A1 | 10/2006 | Silcott |
| 2006/0250236 A1 | 11/2006 | Ackley |
| 2006/0250260 A1 | 11/2006 | Albert |
| 2007/0038334 A1 | 2/2007 | Chou |
| 2007/0061393 A1 | 3/2007 | Moore |
| 2007/0109121 A1 | 5/2007 | Cohen |
| 2007/0132558 A1 | 6/2007 | Rowe |
| 2007/0138307 A1 | 6/2007 | Khoo |
| 2007/0155349 A1 | 7/2007 | Nelson |
| 2007/0168088 A1 | 7/2007 | Ewing |
| 2007/0173978 A1 | 7/2007 | Fein |
| 2007/0182963 A1 | 8/2007 | Wright |
| 2007/0219650 A1 | 9/2007 | Wang et al. |
| 2007/0225868 A1 | 9/2007 | Terlson |
| 2007/0241615 A1 | 10/2007 | Goodrich |
| 2007/0268687 A1 | 11/2007 | Scannell |
| 2007/0276548 A1 | 11/2007 | Uzunovic |
| 2007/0278285 A1 | 12/2007 | Ehrensvaerd |
| 2008/0024089 A1 | 1/2008 | Meng |
| 2008/0096620 A1 | 4/2008 | Lee |
| 2008/0097809 A1 | 4/2008 | Stroman |
| 2008/0106424 A1 | 5/2008 | Bouse |
| 2008/0120296 A1 | 5/2008 | Kariathungal |
| 2008/0123332 A1 | 5/2008 | Searfoss |
| 2008/0143525 A1 | 6/2008 | Woodbury |
| 2008/0155429 A1 | 6/2008 | Frank et al. |
| 2008/0173817 A1 | 7/2008 | Goldstein |
| 2008/0204258 A1 | 8/2008 | Dayton |
| 2008/0211683 A1 | 9/2008 | Curt |
| 2008/0221714 A1 | 9/2008 | Schoettle |
| 2008/0279287 A1 | 11/2008 | Asahina |
| 2008/0291036 A1 | 11/2008 | Richmond |
| 2008/0303678 A1 | 12/2008 | Mccredy |
| 2009/0031786 A1 | 2/2009 | Takeuchi |
| 2009/0054799 A1 | 2/2009 | Vrtis |
| 2009/0065596 A1 | 3/2009 | Seem |
| 2009/0066513 A1 | 3/2009 | Kondo |
| 2009/0073694 A1 | 3/2009 | Scannell, Jr. |
| 2009/0096620 A1 | 4/2009 | Kuo |
| 2009/0105558 A1 | 4/2009 | Riley-Doucet |
| 2009/0140898 A1 | 6/2009 | Ceballos |
| 2009/0141898 A1 | 6/2009 | Huang |
| 2009/0154148 A1 | 6/2009 | Meyer |
| 2009/0157839 A1 | 6/2009 | Diederichs |
| 2009/0193578 A1 | 8/2009 | Jang |
| 2009/0195382 A1 | 8/2009 | Hall |
| 2009/0225480 A1 | 9/2009 | Baxter |
| 2009/0243597 A1 | 10/2009 | Spenik |
| 2009/0271013 A1 | 10/2009 | Chen |
| 2009/0278868 A1 | 11/2009 | Nakahira |
| 2009/0290156 A1 | 11/2009 | Popescu |
| 2009/0298957 A1 | 12/2009 | Gauthier |
| 2010/0025449 A1 | 2/2010 | Longobardi |
| 2010/0033329 A1 | 2/2010 | Davis |
| 2010/0070619 A1 | 3/2010 | Chaganti |
| 2010/0071008 A1 | 3/2010 | Hu |
| 2010/0076615 A1 | 3/2010 | Daniel |
| 2010/0090822 A1 | 4/2010 | Benson |
| 2010/0101264 A1 | 4/2010 | Nishino |
| 2010/0145543 A1 | 6/2010 | Middlemiss |
| 2010/0164742 A1 | 7/2010 | Anderson |
| 2010/0182201 A1 | 7/2010 | Graczyk |
| 2010/0201536 A1 | 8/2010 | Robertson et al. |
| 2010/0228819 A1 | 9/2010 | Wei |
| 2010/0235004 A1 | 9/2010 | Thind |
| 2010/0249955 A1 | 9/2010 | Sitton |
| 2010/0264871 A1 | 10/2010 | Matouka |
| 2010/0274367 A1 | 10/2010 | Kaufman |
| 2010/0296685 A1 | 11/2010 | Carle |
| 2010/0298742 A1 | 11/2010 | Perlman |
| 2010/0298957 A1 | 11/2010 | Sanchez Rocha |
| 2010/0306033 A1 | 12/2010 | Oved |
| 2010/0313748 A1 | 12/2010 | Schluter |
| 2010/0318236 A1 | 12/2010 | Kilborn |
| 2011/0007491 A1 | 1/2011 | Robinson |
| 2011/0025499 A1 | 2/2011 | Hoy |
| 2011/0027626 A1 | 2/2011 | Lattin |
| 2011/0082599 A1 | 4/2011 | Shinde |
| 2011/0093281 A1 | 4/2011 | Plummer |
| 2011/0095801 A1 | 4/2011 | Bjerregaard et al. |
| 2011/0108724 A1 | 5/2011 | Ewing |
| 2011/0185198 A1 | 7/2011 | Ukita |
| 2011/0187542 A1 | 8/2011 | Dittmer |
| 2011/0202193 A1 | 8/2011 | Craig |
| 2011/0216453 A1 | 9/2011 | Haines |
| 2011/0245988 A1 | 10/2011 | Ingels |
| 2011/0260851 A1 | 10/2011 | Richman |
| 2011/0270458 A1 | 11/2011 | Liu |
| 2011/0273283 A1 | 11/2011 | Schmuttor |
| 2011/0275960 A1 | 11/2011 | Westerink |
| 2011/0316355 A1 | 12/2011 | Gruber |
| 2012/0004871 A1 | 1/2012 | Tsao |
| 2012/0022886 A1 | 1/2012 | Ohnemus |
| 2012/0023555 A1 | 1/2012 | Putterman |
| 2012/0025221 A1 | 2/2012 | Sakumoto |
| 2012/0041917 A1 | 2/2012 | Newton |
| 2012/0051714 A1 | 3/2012 | Reimnitz |
| 2012/0071008 A1 | 3/2012 | Sessford |
| 2012/0082180 A1 | 4/2012 | Edwardson |
| 2012/0086402 A1 | 4/2012 | Carder |
| 2012/0087211 A1 | 4/2012 | Lee |
| 2012/0095610 A1 | 4/2012 | Chapel |
| 2012/0098439 A1 | 4/2012 | Recker et al. |
| 2012/0109398 A1 | 5/2012 | Bhakta |
| 2012/0119714 A1 | 5/2012 | Jitaru |
| 2012/0130544 A1 | 5/2012 | Mohan |
| 2012/0154126 A1 | 6/2012 | Cohn |
| 2012/0161969 A1 | 6/2012 | Husen |
| 2012/0166642 A1 | 6/2012 | Saint Clair et al. |
| 2012/0194082 A1 | 8/2012 | Huang |
| 2012/0197196 A1 | 8/2012 | Halbert |
| 2012/0206050 A1 | 8/2012 | Spero |
| 2012/0209634 A1 | 8/2012 | Ling |
| 2012/0229248 A1 | 9/2012 | Parshionikar |
| 2012/0229278 A1 | 9/2012 | Roosli |
| 2012/0258800 A1* | 10/2012 | Mikhailov ............... 463/37 |
| 2012/0265361 A1 | 10/2012 | Billingsley |
| 2012/0268136 A1 | 10/2012 | Lee |
| 2012/0271471 A1 | 10/2012 | Lee |
| 2012/0278101 A1 | 11/2012 | Homchowdhury |
| 2012/0283860 A1 | 11/2012 | Ho |
| 2012/0288124 A1 | 11/2012 | Fejzo |
| 2012/0303554 A1 | 11/2012 | Osann |
| 2012/0314344 A1 | 12/2012 | Lam |
| 2012/0316661 A1 | 12/2012 | Rahman |
| 2012/0319593 A1 | 12/2012 | Jou |
| 2012/0325023 A1 | 12/2012 | Calio |
| 2013/0006436 A1 | 1/2013 | Masters |
| 2013/0013967 A1 | 1/2013 | Gokhale et al. |
| 2013/0021720 A1 | 1/2013 | Ty et al. |
| 2013/0024211 A1 | 1/2013 | Monteforte |
| 2013/0035599 A1 | 2/2013 | De Bruijn |
| 2013/0038470 A1 | 2/2013 | Niemeyer |
| 2013/0049466 A1 | 2/2013 | Adams |
| 2013/0049607 A1 | 2/2013 | Urata |

(56) References Cited

U.S. PATENT DOCUMENTS

| | | | |
|---|---|---|---|
| 2013/0051543 A1 | 2/2013 | McDysan et al. | |
| 2013/0058116 A1 | 3/2013 | Galbas | |
| 2013/0082817 A1 | 4/2013 | Gruenbacher | |
| 2013/0083805 A1 | 4/2013 | Lu | |
| 2013/0085609 A1 | 4/2013 | Barker | |
| 2013/0085615 A1 | 4/2013 | Barker | |
| 2013/0107041 A1 | 5/2013 | Norem | |
| 2013/0119891 A1 | 5/2013 | Herremans | |
| 2013/0135214 A1* | 5/2013 | Li et al. | 345/173 |
| 2013/0141233 A1 | 6/2013 | Jacobs et al. | |
| 2013/0144644 A1 | 6/2013 | Simpson | |
| 2013/0162821 A1 | 6/2013 | Park | |
| 2013/0166089 A1 | 6/2013 | Craig | |
| 2013/0174646 A1 | 7/2013 | Martin | |
| 2013/0175132 A1* | 7/2013 | Battlogg, Stefan | 192/21.5 |
| 2013/0184880 A1 | 7/2013 | Mcmahon | |
| 2013/0200254 A1 | 8/2013 | Johnson | |
| 2013/0201033 A1 | 8/2013 | Cohn | |
| 2013/0234625 A1 | 9/2013 | Kondo | |
| 2013/0238153 A1 | 9/2013 | Warwick | |
| 2013/0264889 A1 | 10/2013 | Quittek | |
| 2013/0271015 A1 | 10/2013 | Peng | |
| 2013/0275148 A1 | 10/2013 | Attaluri | |
| 2013/0289919 A1 | 10/2013 | Wilson | |
| 2013/0338839 A1 | 12/2013 | Rogers | |
| 2013/0339766 A1 | 12/2013 | Chen | |
| 2014/0006506 A1 | 1/2014 | Frei | |
| 2014/0025221 A1 | 1/2014 | Chapel | |
| 2014/0028097 A1 | 1/2014 | Augur | |
| 2014/0032003 A1 | 1/2014 | Chapel | |
| 2014/0035749 A1 | 2/2014 | Reed | |
| 2014/0046599 A1 | 2/2014 | Smith | |
| 2014/0052300 A1* | 2/2014 | Matsuoka et al. | 700/276 |
| 2014/0069131 A1 | 3/2014 | Masui | |
| 2014/0070959 A1 | 3/2014 | Bhargava et al. | |
| 2014/0092765 A1 | 4/2014 | Agarwal | |
| 2014/0098445 A1 | 4/2014 | Hooper | |
| 2014/0099941 A1 | 4/2014 | Ji | |
| 2014/0100700 A1 | 4/2014 | Matsumoto | |
| 2014/0101346 A1 | 4/2014 | Naaman | |
| 2014/0122140 A1 | 5/2014 | Rijnders et al. | |
| 2014/0156084 A1 | 6/2014 | Rahman | |
| 2014/0185646 A1 | 7/2014 | Mowry | |
| 2014/0188286 A1 | 7/2014 | Hunka | |
| 2014/0233186 A1 | 8/2014 | Savelli | |
| 2014/0236372 A1 | 8/2014 | Ewing | |
| 2014/0257572 A1 | 9/2014 | Mohan | |
| 2014/0277869 A1 | 9/2014 | King | |
| 2014/0281544 A1 | 9/2014 | Paczkowski | |
| 2014/0283144 A1 | 9/2014 | Gettings | |
| 2014/0340227 A1 | 11/2014 | Reed | |
| 2015/0021465 A1 | 1/2015 | Gettings | |

OTHER PUBLICATIONS

Baran, Paul, "Packet Switching", Fundamentals of Digital Switching, 2nd Ed., 1990, pp. 193-235.

Brown, Rick, "Nest pulls Protect Smoke Detector from Retail on Safety Issue", CNET. Retrieved from the Internet: <www.cnet.com/news/nest-pulls-protect-smoke-detector-from-retail-on-safety-issue>, accessed on Nov. 3, 2014, 3 pgs.

Carriazo-Osorio, Fernando, "Impacts of Air Pollution on Property Values: An Economic Valuation for Bogota, Columbia", Retrieved from the Internet: <http://www.demogr.mpg.de/papers/workshops/010518_paper02.pdf>, published on Aug. 19, 2007, 16 pgs.

Fadell, Tony. "Consumer Safety Notice for Nest Protect: Smoke + CO Alarm". Retrieved from the Internet: <Nest.com/letter-from-the-ceo>, published on Apr. 3, 2014, 3 pgs.

Dandamudi, Sivarama, "Interrupts", Fundamentals of Computer Organization and Design, Sep. 22, 2001, pp. 825-862.

Dijkman, Greg, "Scientific Gel and Blot Imaging: The difference between resolution and sensitivity with CCD cameras." Retrieved from the Internet: <gregdijkman.com/ccd-camera-imaging-sensitivity-resolution>, accessed on Nov. 5, 2014, 2 pgs.

"For $129, the best smoke detector on the market", CNET. Retrieved from the Internet: <http://www.cnet.com/products/nest-protect>, accessed on Jul. 8, 2014, 4 pgs.

Frederiksen, Rikard, "The optical sensitivity of compound eyes: theory and experiment compared", Bio. Lett., vol. 4, No. 6, Dec. 23, 2008, pp. 745-747.

"Guidance Regarding Methods for De-identification of Protected Health Information in Accordance with the Health Insurance Portability Act (HIPAA) Privacy Rule", Department of Health and Human Services. Retrieved from the Internet: <http://www.hhs.gov/ocr/privacy/hippa/understanding/coveredentities/De-identification/guidance.html>, accessed on Dec. 4, 2014, 18 pgs.

Hayashi, et al., "A Network-Centric approach to Sensor-data and Service Integration", SICE Annual Conference 2011, Sep. 13, 2011, pp. 2037-2042.

Huang, et al., "Pervasive, Secure Access to a Hierarchical Sensor-Based Healthcare Monitoring Architecture in Wireless Heterogeneous Networks", IEEE Journal on Selected Areas in Communication, vol. 27, No. 4, May 2009, pp. 400-411.

Mainwaring, "Wireless Sensor Networks for Habitat Monitoring", WNSA '02, Sep. 28, 2002, pp. 88-97.

McCracken, Harry, "Nest's Smoke Detector Recall; Doesn't Mean You Need to Send Yours Back", Retrieved from the Internet: <http://time.com/108171/nest-recall/>, published on May 21, 2014, 2 pgs.

Miyaho, et al. "Sensor Network Management for Healthcare applications", 2010 Fifth International Conference on Systems and Networks Communications, 2010, pp. 14-20.

Moffat, "Notes on Using Thermocouples". Retrieved from the Internet: <http://www.electronics-cooling.com/1197/01/notes-on-using-thermocouples/>, accessed on Nov. 6, 2014, pp. 1-9.

Mogg, Trevor, "Nest Recall 440,000 Protect Smoke alarms, Issues Software Update that fixes Glitch". Retrieved from the Internet: <http://www.digitaltrends.com/home/nest-halts-sales-of-nest-protect-smoke-alarm/>, published on May 21, 2014, 5 pgs.

"Nest Labs Recall to Repair Nest Protect Smoke + CO Alarms Due to Failure to Sound Alert". Retrieved from the Internet: <http://www.cpsc/gov/en/Recalls/2014/Nest-Labs-Recalls-to-Repair-Nest-protect-Smoke-CO-Alarms>, published on May 21, 2014, 3 pgs.

"Nest Protect", Manual, Oct. 2013, 2 pgs.

Noh, Sun-Kuh et al. "Design of a Room Monitoring System for Wireless Sensor Networks", Intl. Journal of Distributed Sensor Networks, vol. 2013, Article ID 189840, 2013, 7 pages.

"Optical Resolution .", Retrieved from the Internet: <en.wikepedia.org/wiki.Optical_resolution>, accessed on Nov. 5, 2014, 11 pgs.

"Privacy Protector:6 Good Reasons to De-Indentify Data". Retrieved from the Internet: <http://privacyguidance.com/blog/6-good-reasons-to-de-identify-data>, accessed on Dec. 8, 2014, 6 pgs.

"Resolution and Sensitivity". Retrieved from the Internet: <www.atnf.csiro.au/outreach/education/senior/astrophysics/resolution_sensitivity.html>, accessed on Nov. 5, 2014, 5 pgs.

Steenerson, Christopher E, "Education in Microscopy and Digital Imaging". Retrieved from the Internet: <zeiss-campus.magnets.fsu.edu/tutorials/basics/spatialfrequency/indexfalsh.html>, accessed on Nov. 5, 2014, 2 pgs.

"Symptom—Definition by Merriam-Webster", Retrieved from the Internet: <http://www.merriam-webster.com/medical/symptom/>, accessed on Dec. 4, 2014, 3 pgs.

"Tutorial on Spatial Frequency Analysis". Retrieved from the Internet: <www.psy.vanderbilt.edu/courses/hon185/SpatialFrequency/SpatialFrequency.html>, accessed on Nov. 5, 2014, 10 pgs.

"What is Nest Wave and how does it work?". Retrieved from the Internet: <support/nest.com/article/what-is-nest-wave-and-how-does-it-work>, accessed on Nov. 5, 2014, 3 pgs.

Yildiz, "Potential ambient Energy-Harvesting Sources and Techniques", The Journal of Technology Studies, vol. 35, No. 1. Fall 2009, pp. 1-14. Retrieved from the Internet: <http://scholar.lib.vt.edu/ejournals/JOTS/v35lv35n1/yidliz.html>, accessed on Jan. 27, 2015.

* cited by examiner

INTUITIVE THERMAL USER INTERFACE

CROSS REFERENCE TO RELATED APPLICATION

This application claims priority under 35 U.S.C. §120 as a Continuation Patent Application to U.S. patent application Ser. No. 14/470,774, entitled "Intuitive Thermal User Interface," by Nina S. Joshi, Bjorn H. Hovland, Aaron H. Squier, and Andrew G. Stevens, filed on Aug. 27, 2014, the contents of which are herein incorporated by reference.

BACKGROUND

1. Field

The described embodiments relate generally to a user interface for use with an electronic device. More specifically, the described embodiments relate to a user interface that provides thermal feedback to a user.

2. Related Art

Trends in connectivity and in portable electronic devices are resulting in dramatic changes in people's lives. For example, the Internet now allows individuals access to vast amounts of information, as well as the ability to identify and interact with individuals, organizations and companies around the world. This has resulted in a significant increase in online financial transactions (which are sometimes referred to as 'ecommerce'). Similarly, the increasingly powerful computing and communication capabilities of portable electronic device (such as smartphones and tablets), as well as a large and growing set of applications, are accelerating these changes, providing individuals access to information at arbitrary locations and the ability to leverage this information to perform a wide variety of tasks.

Recently, it has been proposed these capabilities be included in other electronic devices that are located throughout our environments, including those that people interact with infrequently. In the so-called 'Internet of things,' it has been proposed that future versions of these so-called 'background' electronic devices be outfitted with more powerful computing capabilities and networking subsystems to facilitate wired or wireless communication. For example, the background electronic devices may include: a cellular network interface (LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface (such as a near-field-communication interface). These capabilities may allow the background electronic devices to be integrated into information networks, thereby further transforming people's lives.

However, the overwhelming majority of the existing background electronic devices in people's homes, offices and vehicles have neither enhanced computing capabilities (such as processor that can execute a wide variety of applications) nor networking subsystems. Given the economics of many market segments (such as the consumer market segment), these so-called 'legacy' background electronic devices (which are sometimes referred to as 'legacy electronic devices') are unlikely to be rapidly replaced.

These barriers to entry and change are obstacles to widely implementing the Internet of things. For example, in the absence of enhanced computing capabilities and/or networking subsystems it may be difficult to communicate with the legacy electronic devices. Furthermore, even when electronic devices include enhanced computing capabilities and/or networking subsystems, power consumption and battery life may limit the applications and tasks that can be performed. In addition, it is often difficult to use the legacy electronic devices.

SUMMARY

The described embodiments relate to an electronic device that includes a user-interface device having a surface that receives a setting based on tactile interaction with a user of the electronic device. Moreover, the electronic device includes a thermal mechanism, thermally coupled to a portion of the user-interface device, which establishes a temperature gradient on the surface based on the setting.

For example, the thermal mechanism may include a heat source that increases a temperature of the portion of the user-interface device. Alternatively or additionally, the thermal mechanism may include a heat sink that decreases a temperature of another portion of the user-interface device, which is different that the portion of the user-interface device.

Furthermore, the thermal mechanism may dynamically modify the temperature gradient based on the tactile interaction with the user and an environmental condition in an external environment that includes the electronic device. For example, the tactile interaction may include changing the setting of the electronic device using the user-interface device.

Note that the user-interface device may include: a touch pad, a multi-touch display (i.e., a display that the user interacts with using one or more digits), and/or a knob. Thus, the tactile interaction with the user may occur with a physical control object (such as the knob) and/or with a virtual icon displayed on the multi-touch display.

Additionally, the electronic device may include a thermostat.

In some embodiments, a thermal impedance of the user-interface device varies over the user-interface device to increase user perception of the temperature gradient. For example, the variation in the thermal impedance may be associated with different thicknesses of a material in at least one layer in the user-interface device. Alternatively or additionally, a cross-sectional area of the portion of the user-interface device varies as the user changes the setting using the user-interface device.

Moreover, a texture may vary over the surface of the user-interface device to increase user perception of the temperature gradient.

Furthermore, at a given time, the thermal mechanism may provide a static thermal flux. Alternatively, at a given time, the thermal mechanism may establish the temperature gradient by duty-cycle averaging thermal pulses.

In some embodiments, the user-interface device provides additional sensory feedback to the user. For example, the user-interface device may rotate about an axis, and a rotational resistance of the user-interface device may vary as the user rotates the user-interface device between end rotation positions associated with extrema of settings defined using the user-interface device. The rotational resistance may vary continuously as the user-interface device is rotated between the end rotation positions. Alternatively or additionally, the rotational resistance may vary when the user-interface device is rotated in proximity to the end rotation positions. Note that the rotation resistance may be associated with: an electromagnet, a ferro-magnet, a phase change of a material, a magnetorheological fluid, and/or a mechanical stop.

Another embodiment provides an electronic device that includes the user-interface device and the thermal mechanism described above. In addition, the electronic device may include a control mechanism that modifies a function of the electronic device based on the received setting.

Another embodiment provides a method for interacting with the user, which may be performed by an embodiment of the electronic device. During operation, the electronic device receives the setting based on the tactile interaction between the user and the surface of the user-interface device in the electronic device. Then, the thermal mechanism in the electronic device establishes the temperature gradient on the surface based on the setting.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that provides thermal feedback to a user is described. In particular, when the user provides a setting via tactile interaction with a surface of a user-interface device in the electronic device, a thermal mechanism in the electronic device establishes a temperature gradient on the surface based on the setting. For example, the thermal mechanism may include a heat source that increases a temperature of the portion of the user-interface device and/or a heat sink that decreases a temperature of another portion of the user-interface device. Moreover, the thermal mechanism may dynamically modify the temperature gradient based on the tactile interaction and an environmental condition (such as the temperature) in an external environment that includes the electronic device. Note that the tactile interaction with the user may occur with a physical control object (such as a knob) and/or with a virtual icon displayed on a multi-touch display.

In this way, the electronic device may intuitively provide thermal feedback to the user. For example, the user-interface device may be associated with a thermostat, and the thermal feedback may intuitively alert the user to the consequences of changes to a temperature setting relative to the current temperature in a room. Thus, when the temperature setting exceeds the current temperature, the temperature of the surface may be increased, and when the temperature setting is less than the current temperature, the temperature of the surface may be decreased. This intuitive feedback may make the electronic device easier and/or more enjoyable to user. The resulting improved functionality offered by the electronic device may promote sales of the electronic device (and, more generally, commercial activity) and may enhance customer satisfaction with the electronic device.

Note that this user-interface technique is not an abstract idea. In particular, the intuitive thermal feedback (and, more generally, the intuitive sensory feedback) in the embodiments of the user-interface technique is not: a fundamental economic principle, a human activity, and/or a mathematical relationship/formula. Moreover, the user-interface technique amounts to significantly more than an alleged abstract idea. In particular, the user-interface technique may improve the functioning of the electronic device that executes software and/or implements the user-interface technique. For example, the user-interface technique may: improve the user-friendliness of a user interface that includes the user-interface device; and/or improve other performance metrics related to the function of the electronic device. Furthermore, the thermal gradient established by the thermal mechanism in the electronic device constitutes a technical effect in which information is transformed.

Figure 1:
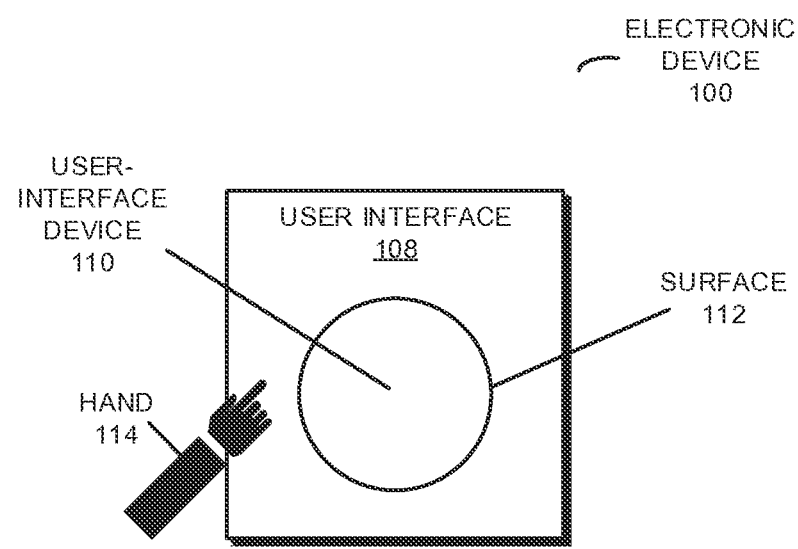
FIG. 1 is a block diagram illustrating a front view of a user interface in an electronic device in accordance with an embodiment of the present disclosure.

We now describe embodiments of a user interface in the electronic device. FIG. 1 presents a block diagram illustrating a front view of a user interface 108 in an embodiment of electronic device 100. This electronic device includes a user-interface device 110 having a surface 112 that receives a setting based on tactile interaction with a user of electronic device 100. For example, user-interface device 110 may include a rotatable knob, and the user may change the setting by grasping the knob with two or more fingers or digits on a hand 114 and rotating the knob clockwise or counterclockwise. While a knob is used as an illustration in FIG. 1, in other embodiments user interface 108 includes a wide variety of user-interface devices, including: a touch pad, a multi-touch display (i.e., a display that the user interacts with using one or more digits), a keyboard, a mouse, a stylus, etc. Thus, the tactile interaction with the user may occur with a physical control object (such as the knob) and/or with a virtual icon (such as a virtual icon displayed on the multi-touch display).

Figure 2:
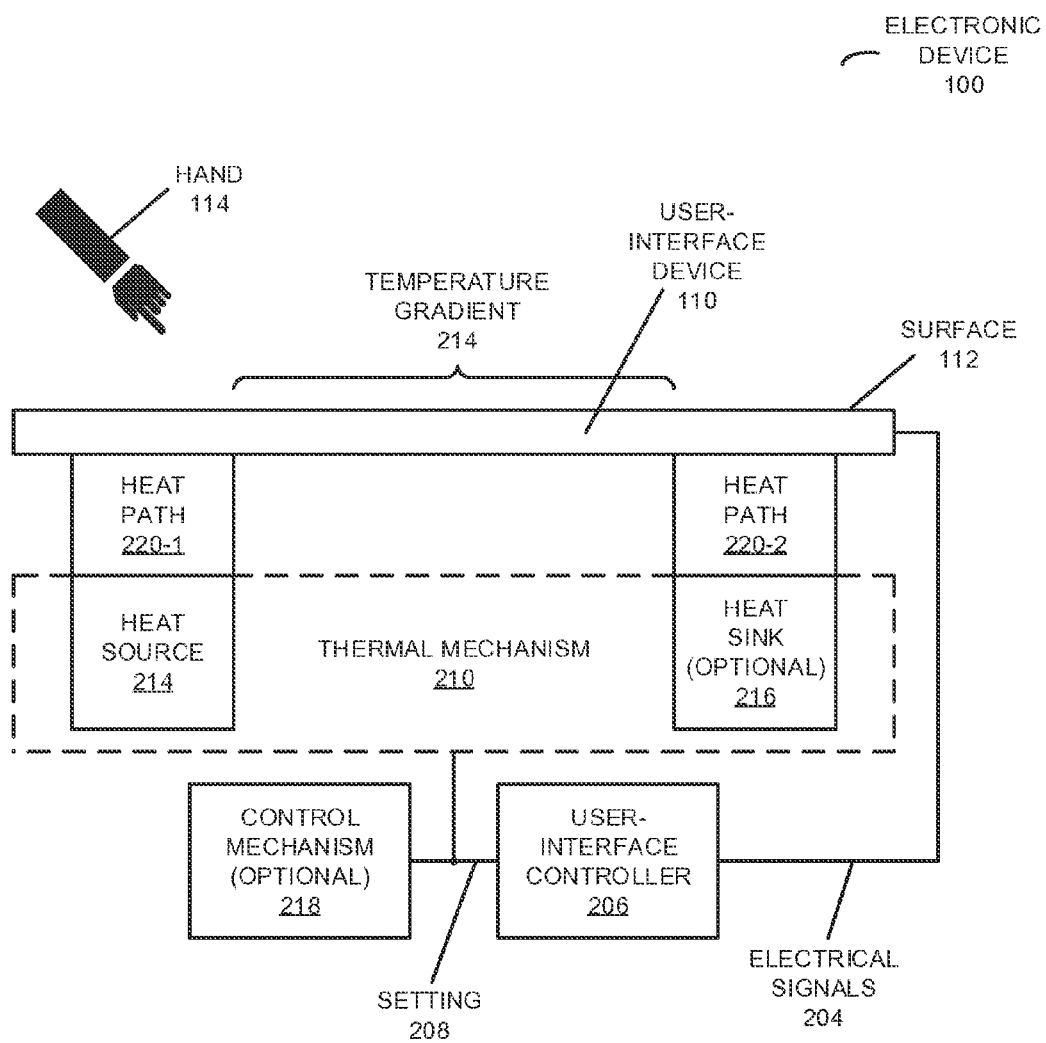
FIG. 2 is a block diagram illustrating a side view of the user interface in the electronic device of FIG. 1 in accordance with an embodiment of the present disclosure.

FIG. 2 presents a block diagram illustrating a side view of the user interface in an embodiment of electronic device 100. In particular, electronic device may include a thermal mechanism 210, thermally coupled to a portion of user-interface device 110, which establishes a temperature gradient 212 on surface 210 based on setting 208 received from user-interface device 110 via a user-interface controller 206 (which converts electrical signals 204 into setting 208 on outputs setting 208 on a signal line), so that there is a hot side and cold side of user-interface device 110. (In FIG. 2, user-interface device 110 is illustrated as a touchpad or a multi-touch screen. However, as noted previously, a wide variety of user-interface devices may be used in this and the other described embodiments.) For example, thermal mechanism 210 may include a heat source 214 thermally coupled to user-interface device 110 by heat path 220-1, which increases a temperature of the portion of user-interface device 110. Alternatively or additionally, thermal mechanism 210 may include an optional heat sink 216 thermally coupled to user-interface device 110 by heat path 220-2, which decreases a temperature of another portion of user-interface device 110, which is different that the portion of user-interface device 110. Note that user-interface device 110 may have a thermal time constant that allows temperature gradient 112 to be established while the user interacts with user-interface device 110 to change setting 208, and a thermal impedance (or thermal resistance) that allows the user to perceive temperature gradient 212 while the user interacts with user-interface device 110 to change the setting 208.

As an example, heat source 214 may include a resistor (whose temperature can be changed by changing a magnitude of a DC or the magnitude or frequency of an AC current), and optional heat sink 216 may include Peltier cooler (and, more generally, a thermoelectric or a solid-state cooler) or a fan (and, more generally, a forced-fluid driver) that cools the other portion. In another example, a heat pump (such as a solid-state thermal element based on the Peltier effect or heat pipe that includes counterflows of different phases of a material) establishes temperature gradient 212. More generally, heat source 214 may be a direct or indirect heat source, and/or optional heat sink 216 may be a direct or indirect heat sink. In addition, heat source 214 and/or optional heat sink 216 may be active or passive components.

At a given time, thermal mechanism 210 may provide a static thermal flux. Alternatively, at a given time, thermal mechanism 210 may establish temperature gradient 212 by duty-cycle averaging thermal pulses. More generally, thermal mechanism 210 may establish temperature gradient 212 using a variety of modulation techniques, including: amplitude modulation, frequency modulation, phase modulation, pulse-code modulation, a sigma-delta modulator, etc.

In an exemplary embodiment, thermal mechanism 210 dynamically modifies temperature gradient 212 based on the tactile interaction with the user (and, in particular, the user changing setting 208 using user-interface device 110) and an environmental condition in an external environment (such as a room or a portion of a building) that includes electronic device 100. For example, electronic device 100 may include a thermostat. As the user adjusts or changes a temperature setting relative to a current temperature in the external environment, thermal mechanism 210 may increase or decrease temperature gradient 212 to give the user real-time (relative to the rate at which the user changes or adjusts the temperature setting) thermal feedback. Thus, as the temperature setting exceeds and then progressively increases relative to the current temperature, thermal mechanism 210 may increase temperature gradient 212 so that the temperature of the portion of surface 112 the user is touching increases. Similarly, as the temperature setting drops below and then progressively decreases relative to the current temperature, thermal mechanism 210 may decrease temperature gradient 212 so that the temperature of the portion of surface 112 the user is touching decreases. These changes in temperature gradient 212 may allow the user to intuitively understand the consequences of the changes in the temperature setting. However, while the preceding example used a temperature setting of a thermostat as an illustration, the user-interface technique may be used with a wide variety or types of settings, such as: humidity, air-quality settings, lighting settings, etc.

In some embodiments, electronic device 100 includes an optional control mechanism 218 that modifies a function of electronic device 100 based on received setting 208. In the case of the thermostat example, optional control mechanism 218 may change a feedback signal to a heating element (such as a furnace) and/or a cooling element (such as an air conditioner or a fan) in response to setting 208. This change in the feedback signal may provide closed-loop control of an environmental condition (such as the temperature) in the external environment that includes electronic device 100.

Figure 3:
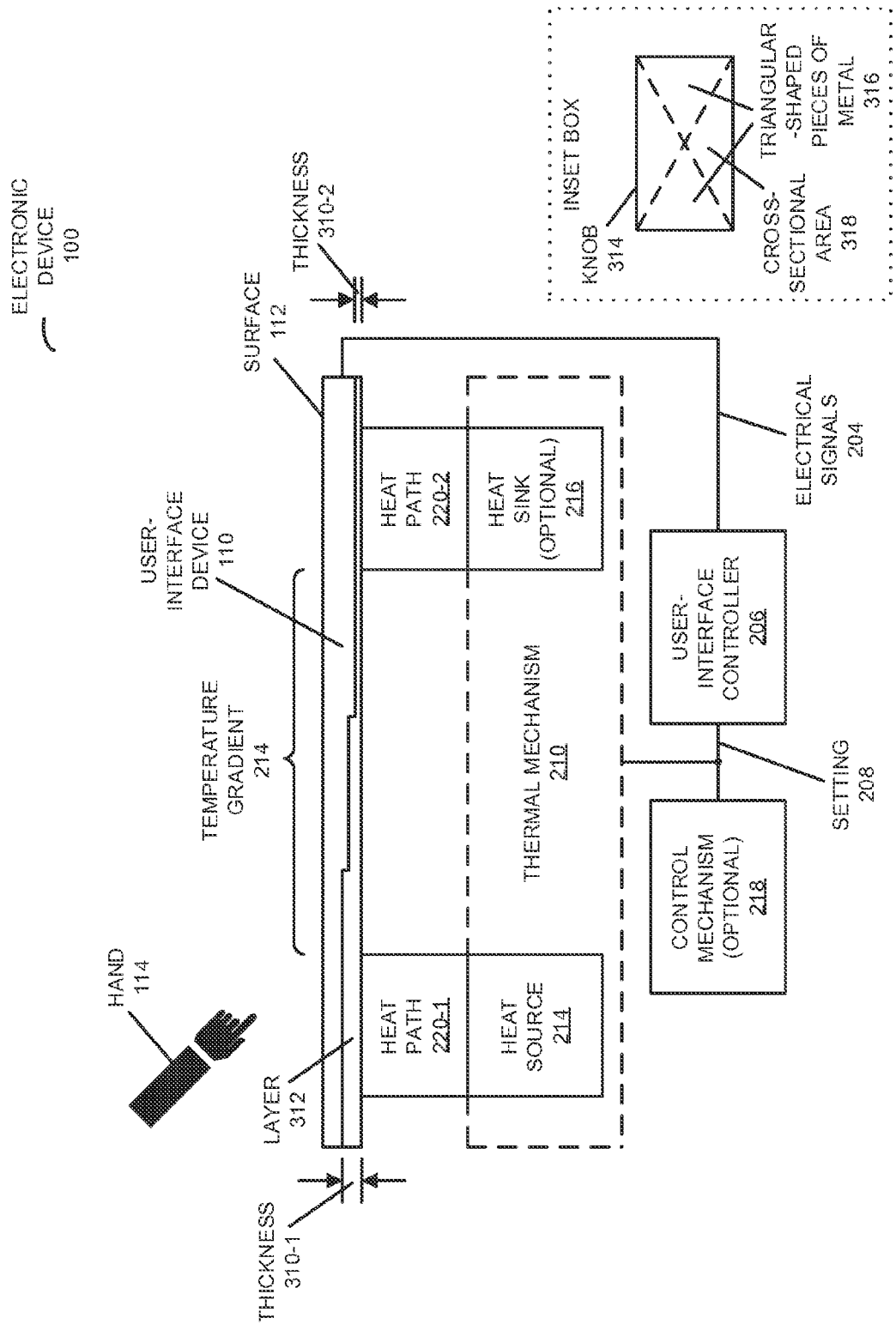
FIG. 3 is a block diagram illustrating a side view of the user interface in the electronic device of FIG. 1 in accordance with an embodiment of the present disclosure.

The user-interface device may include one or more features that enhance (or reduce) the temperature gradient. This is illustrated in FIG. 3, which presents a block diagram illustrating a side view of the user interface in an embodiment of electronic device 100. In particular, a thermal impedance of user-interface device 110 may vary over user-interface device 110 (such as over surface 112) to increase user perception of temperature gradient 212. For example, the variation in the thermal impedance may be associated with different thicknesses 310 of a material in at least one layer 312 in user-interface device 110. Alternatively or additionally, a cross-sectional area of the portion of user-interface device 110 may vary as the user changes setting 208 using user-interface device 110. For example, as shown in the inset box in FIG. 3, in the case of knob 314, two triangular-shaped pieces of metal 316 may be rotated past each other as knob 314 is turned, thereby changing the cross-sectional area(s) (such as cross-sectional area 318) in one or more thermal paths between heat source 214 and the portion of user-interface device 110 on surface 112, and/or between optional heat sink 216 and the other portion of user-interface device 110 on surface 112. In some embodiments, the thermal impedance is dynamically changed by dynamically inducing a phase change in a material in user-interface device 110 (such as an organic phase-change material, an inorganic phase-change material, a eutectic phase-change material, etc.), thereby dynamically varying the thermal conductivity of the material. For example, the thermal conductivity of nanofibers of polyethylene can be dynamically varied by applying temperature and/or stress.

Figure 4:
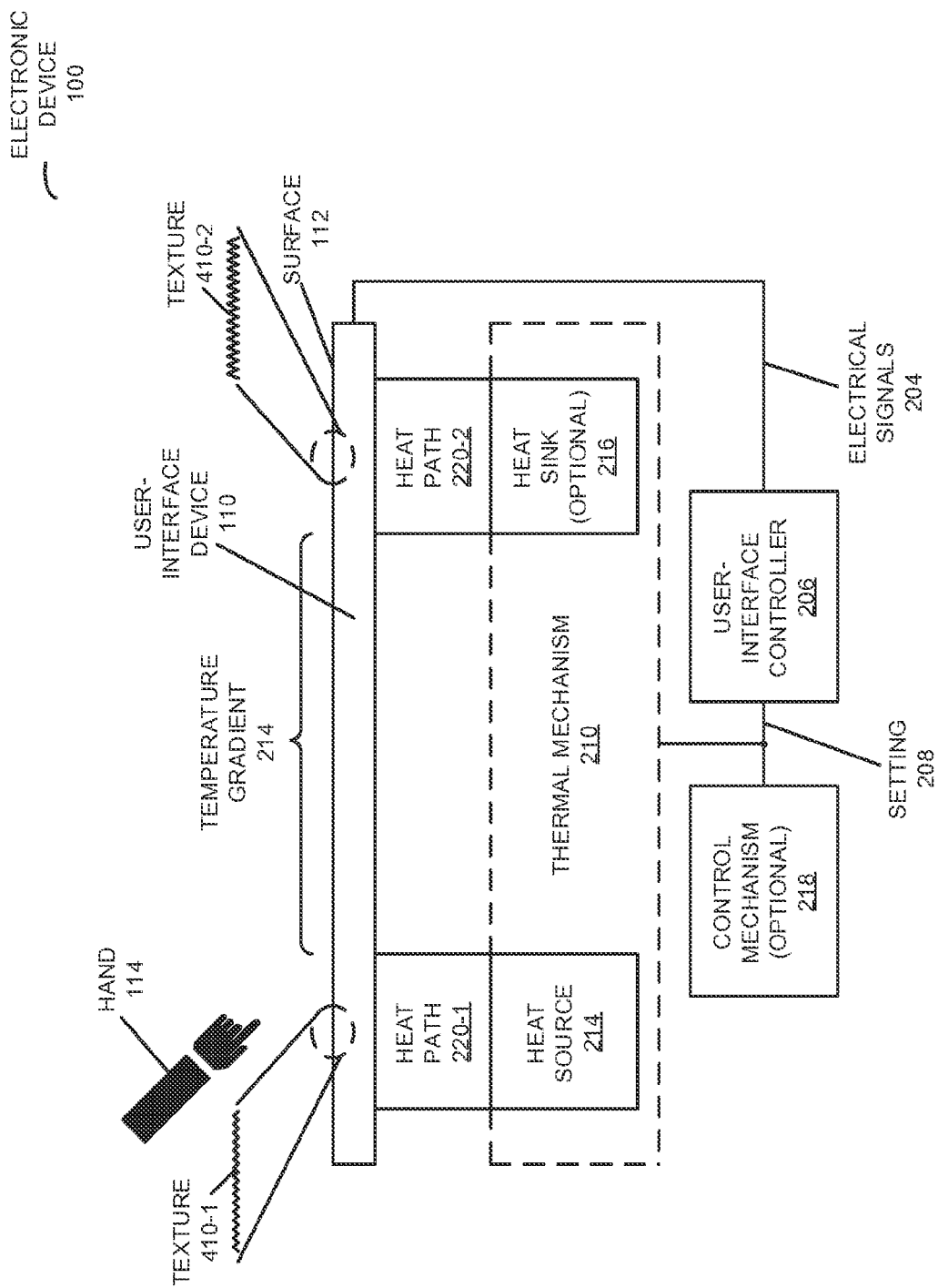
FIG. 4 is a block diagram illustrating a side view of the user interface in the electronic device of FIG. 1 in accordance with an embodiment of the present disclosure.

Alternatively or additionally, the user-interface device may include one or more features that enhance (or reduce) the user's perception of the temperature gradient. This is shown in FIG. 4, which presents a block diagram illustrating a side view of the user interface in an embodiment of electronic device 100. In particular, textures 410 may vary over surface 112 of the user-interface device 110 to increase (or decrease) user perception of temperature gradient 212. Thus, there may be a coarse texture towards one end of surface 112 and a fine texture towards the other end.

Figure 5:
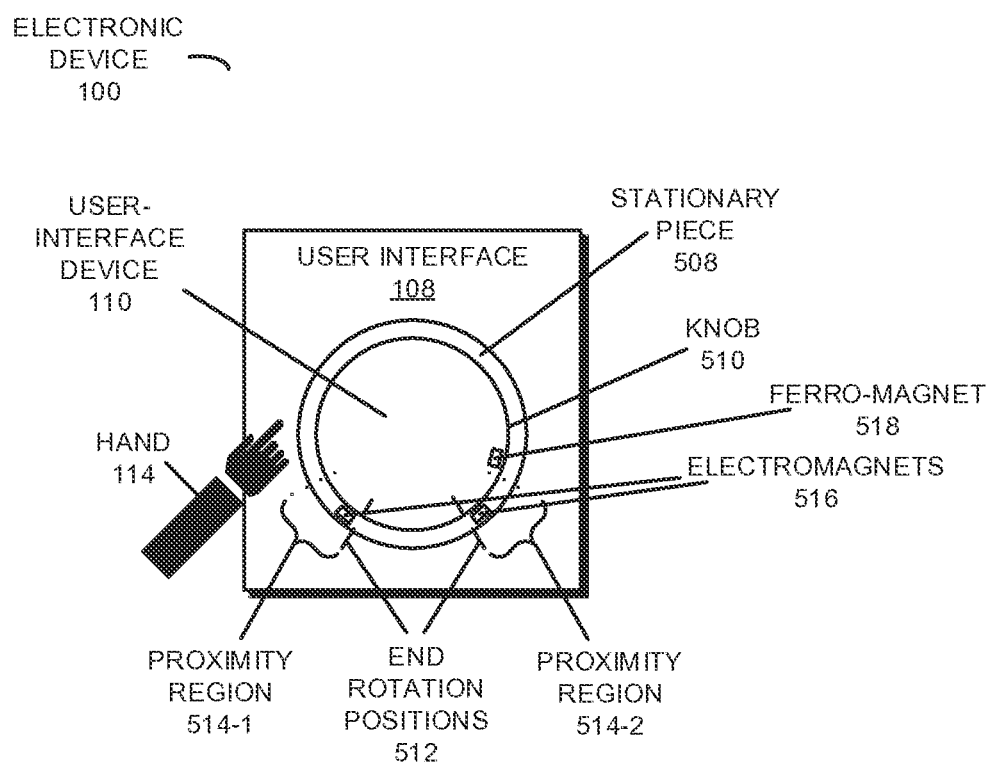
FIG. 5 is a block diagram illustrating a front view of user interface in the electronic device of FIG. 1 in accordance with an embodiment of the present disclosure.

In some embodiments, in addition to the thermal feedback, the user-interface device provides additional sensory feedback to the user. This is shown in FIG. 5, which presents a block diagram illustrating a front view of user interface 108 in an embodiment of electronic device 100. In particular, user-interface device 110 may rotate about an axis (e.g., user-interface device 110 may include a physical or a virtual knob, such as knob 510, which is rotated relative to a stationary piece 508), and a rotational resistance of user-interface device 110 may vary as the user rotates user-interface device 110 between end rotation positions 512 associated with extrema of settings defined using user-interface device 110. The rotational resistance may vary continuously as user-interface device 110 is rotated between end rotation positions 512. Alternatively or additionally, the rotational resistance may vary when user-interface device 110 is rotated in proximity regions 514 to end rotation positions 512 (such as within 5° of end rotation positions 512). As shown in FIG. 5, the rotation resistance is varied using electromagnet 516 and a ferromagnet 518, so that the rotation resistance increases in a counterclockwise direction and decreases in a clockwise direction. However, a variety of techniques may be used to change the rotation resistance, including: an electromagnet, a ferro-magnet, a phase change of a material, a magnetorheological fluid, and/or a mechanical stop.

Although we describe the environments shown in FIGS. 1-5 as examples, in alternative embodiments different numbers or types of components may be present. For example, some embodiments comprise more or fewer components, components may be at different positions and/or two or more components may be combined into a single component.

Figure 6:
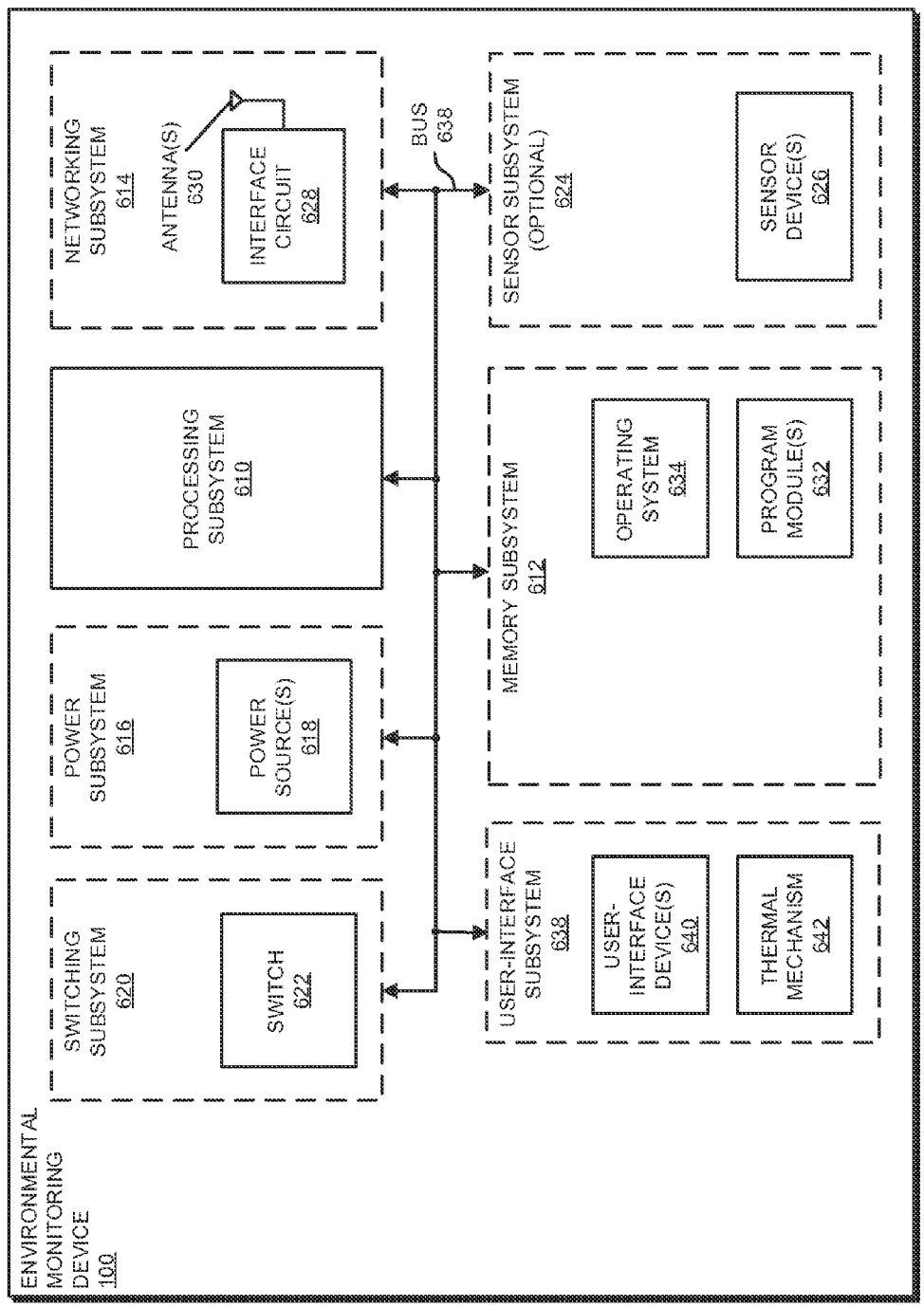
FIG. 6 is a block diagram illustrating the electronic device of FIG. 1 in accordance with an embodiment of the present disclosure.

FIG. 6 presents a block diagram illustrating an embodiment of electronic device 100. This electronic device includes processing subsystem 610 (and, more generally, an integrated circuit or a control mechanism), memory subsystem 612, a networking subsystem 614, power subsystem 616, switching subsystem 620, optional sensor subsystem 624 (i.e., a data-collection subsystem and, more generally, a sensor mechanism), and/or user-interface subsystem 638. Processing subsystem 610 includes one or more devices configured to perform computational operations and to execute techniques to process sensor data. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610, networking subsystem 614, optional sensor subsystem 624 and/or user-interface subsystem 638. For example, memory subsystem 612 can include dynamic random access memory (DRAM), static random access memory (SRAM), and/or other types of memory. In some embodiments, instructions for processing subsystem 610 in memory subsystem 612 include: one or more program modules 632 or sets of instructions, which may be executed in an operating environment (such as operating system 634) by processing subsystem 610. Note that the one or more computer programs may constitute a computer-program mechanism or a program module. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 100. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 100 as fast-access storage for often-used data, while the mass-storage device is used to store less frequently used data.

Networking subsystem 614 includes one or more devices configured to couple to and communicate on a wired, optical and/or wireless network (i.e., to perform network operations and, more generally, communication), including an interface circuit 628 (such as a ZigBee® communication circuit) and one or more antennas 630. For example, networking subsystem 614 may include: a ZigBee® networking subsystem, a Bluetooth™ networking system (which can include Bluetooth™ Low Energy, BLE or Bluetooth™ LE), a cellular networking system (e.g., a 3G/4G network such as UMTS, LTE, etc.), a USB networking system, a networking system based on the standards described in IEEE 802.11 (e.g., a Wi-Fi® networking system), an Ethernet networking system, an infra-red communication system, a power-line communication system and/or another communication system (such as a near-field-communication system or an ad-hoc-network networking system).

Moreover, networking subsystem 614 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 100 may use the mechanisms in networking subsystem 614 for performing simple wireless communication between electronic device 100 and other electronic devices, e.g., transmitting advertising frames, petitions, beacons and/or information associated with near-field communication.

Moreover, electronic device 100 may include power subsystem 616 with one or more power sources 618. Each of these power sources may include: a battery (such as a rechargeable or a non-rechargeable battery), a DC power supply, an AC power supply, a switched-mode power supply, a regulated power supply and/or a transformer. In some embodiments, power subsystem 616 includes a recharging circuit that recharges a rechargeable battery in at least one of power sources 618. This may facilitate the recharging by converting an electrical signal in power subsystem 616 into a DC or an AC electrical signal that is suitable for recharging the rechargeable battery. Furthermore, the one or more power sources 618 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid or may be remateable. Note that the one or more power sources 618 may be mechanically and electrically coupled to an external power source or another electronic device by one of the electrical-connection nodes in switch 622 in switching subsystem 620.

In some embodiments, power subsystem 616 includes or functions as a pass-through power supply for one or more electrical connectors to an external electronic device (such as an appliance or a regulator device) that can be plugged into the one or more electrical connectors. Power to the one or more electrical connectors (and, thus, the external electronic device) may be controlled locally by processing subsystem 610, switching subsystem 620 (such as by switch 622), and/or remotely via networking subsystem 614.

Furthermore, optional sensor subsystem 624 may include one or more sensor devices 626 (or a sensor array), which may include one or more processors and memory. For example, the one or more sensor devices 626 may include: a thermal sensor (such as a thermometer), a humidity sensor, a barometer, a camera or video recorder (such as a CCD or CMOS imaging sensor), one or more microphones (which may be able to record acoustic information, including acoustic information in an audio band of frequencies, in mono or stereo), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a chemical-analysis device, a mass spectrometer, a microanalysis device, a nano-plasmonic sensor, a genetic sensor (such as a micro-array), an accelerometer, a position or a location sensor (such as a location sensor based on the Global Positioning System or GPS), a gyroscope, a motion sensor (such as a light-beam sensor), a contact sensor, a strain sensor (such as a strain gauge), a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 626 may include redundancy (such as multiple instances of a type of sensor device) to address sensor failure or erroneous readings, to provide improved accuracy and/or to provide improved precision.

Additionally, user-interface subsystem 638 may include one or more user-interface devices 640 (such as a touchpad, a knob, a multi-touch screen, a keyboard, a mouse, a stylus, etc.) and thermal mechanism 642 for establishing a temperature gradient on a given one of the one or more user-interface devices 640 in response to tactile interaction with a user of electronic device 100. In addition, user-interface subsystem 638 may include user-interface controllers (or input-output controllers) for the one or more user-interface devices 640, which convert between electrical signals to or from the one or more user-interface devices 640, and values used by electronic device 100 (such as setting 108 in FIGS. 2-4).

During operation of electronic device 100, processing subsystem 610 may execute one or more program modules 632, such as an environmental-monitoring application that uses one or more sensor devices 626 to measure environmental signals associated with an external environment that includes electronic device 100. The resulting measurements may be analyzed by the environmental-monitoring application to identify or determine an environmental condition associated with the external environment. Moreover, the environmental condition may be used by the environmental-monitoring application to modify operation of electronic device and/or the external electronic device (such as a regulator device), and/or to provide information about the external environment to another (separate) electronic device (e.g., via networking subsystem 614).

Furthermore, processing subsystem 610 may execute a user-interface application that receives a setting from a user of electronic device based on the user's tactile interaction with a given one of the one or more user-interface devices 640. Then, user-interface application may instruct or may provide a control signal to thermal mechanism 642 to modify a temperature gradient on a surface of the gibe one of user-interface devices 640 to provide intuitive thermal feedback (and, more generally, sensory feedback) to the user about the setting. In some embodiments, user-interface application modifies a function of electronic device 100 based on the received setting. For example, user-interface application may instruct or may provide a control signal to change a state of switch 622 (from open to closed or vice versa), thereby changing electrical coupling of a regulator device to one of power sources 618. In this way, electronic device 100 may respond to the received setting so that an environmental condition (such as the temperature, humidity, a lighting condition, an allergen level, etc.) in the external environment can be dynamically modified.

Within electronic device 100, processing subsystem 610, memory subsystem 612, networking subsystem 614, power subsystem 616, switching subsystem 620, optional sensor subsystem 624 and/or user-interface device 638 may be coupled using one or more interconnects, such as bus 636. These interconnects may include an electrical, optical, and/or electro-optical connection that the subsystems can use to communicate commands and data among one another. Note that different embodiments can include a different number or configuration of electrical, optical, and/or electro-optical connections among the subsystems.

Electronic device 100 can be (or can be included in) a wide variety of electronic devices. For example, electronic device 100 can be (or can be included in): a sensor (such as a smart sensor), a tablet computer, a smartphone, a cellular telephone, an appliance, a regulator device, a consumer-electronic device (such as a baby monitor), a portable computing device, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), an alarm, a smoke detector, a carbon-monoxide detector, a monitoring device, and/or another electronic device (such as a switch or a router).

Although specific components are used to describe electronic device 100, in alternative embodiments, different components and/or subsystems may be present in electronic device 100. For example, electronic device 100 may include one or more additional processing subsystems, memory subsystems, networking subsystems, power subsystems, switching subsystems, sensor subsystems and/or user-interface subsystems. Additionally, one or more of the subsystems may not be present in electronic device 100. Moreover, in some embodiments, electronic device 100 may include one or more additional subsystems that are not shown in FIG. 6, such as a display subsystem, and/or a feedback subsystem (which may include speakers and/or an optical source).

Although separate subsystems are shown in FIG. 6, in some embodiments, some or all of a given subsystem or component can be integrated into one or more of the other subsystems or components in electronic device 100. For example, in some embodiments the one or more program modules 632 are included in operating system 634. In some embodiments, a component in a given subsystem is included in a different subsystem.

Moreover, the circuits and components in electronic device 100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614 (such as a radio) and, more generally, some or all of the functionality of electronic device 100. Moreover, the integrated circuit may include hardware and/or software mechanisms that are used for transmitting wireless signals from electronic device 100 to, and receiving signals at electronic device 100 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the radios described in single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, a petition, a beacon, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Note that aspects of the user-interface technique may be implemented using an integrated circuit (such as a user-interface controller). In some embodiments, an output of a process for designing an integrated circuit, or a portion of an integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

Figure 7:
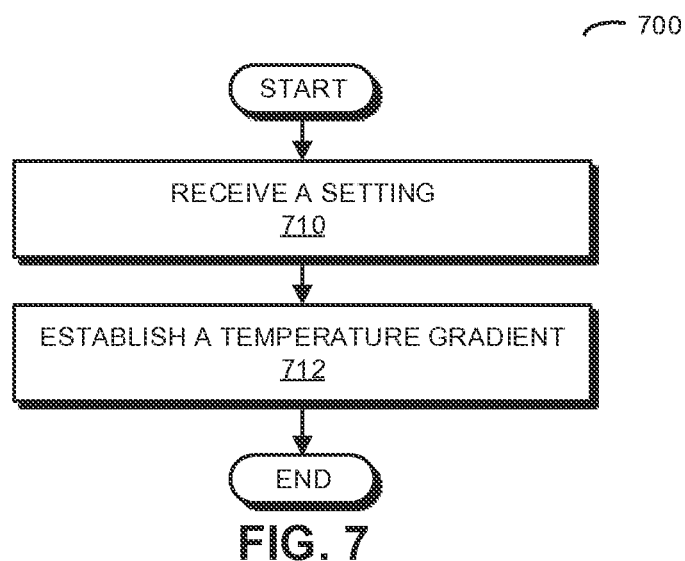
FIG. 7 is a flow diagram illustrating a method for interacting with a user in accordance with an embodiment of the present disclosure.

We now further describe the user-interface technique and operation of the electronic device. FIG. 7 presents a flow diagram illustrating a method 700 for interacting with a user, which may be performed by electronic device 100 (FIGS. 1 and 6). During operation, the electronic device receives a setting (operation 710) based on tactile interaction between the user and a surface of a user-interface device in the electronic device. Then, a thermal mechanism in the electronic device establishes a temperature gradient (operation 712) on the surface based on the setting.

Figure 8:
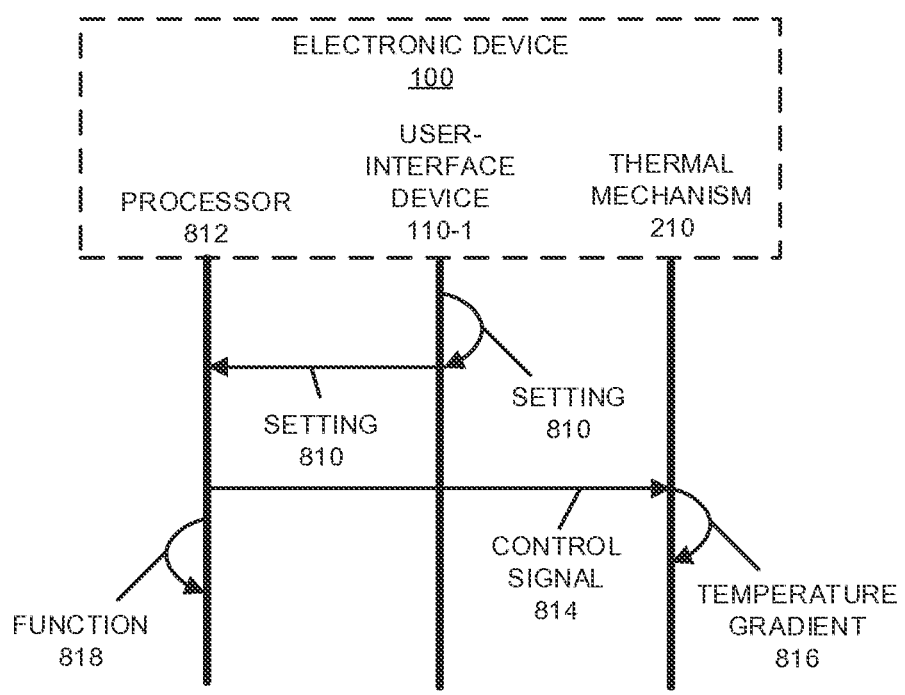
FIG. 8 is a drawing illustrating communication within the electronic device of FIGS. 1 and 6 during the method of FIG. 7 in accordance with an embodiment of the present disclosure.

FIG. 8 presents a drawing illustrating communication within electronic device 100 during method 700 (FIG. 7). During operation of electronic device 100, a user adjusts user-interface device 110 to change a setting 810. In response to receiving setting 810, processor 812 provides control signal 814 to thermal mechanism 210, which changes a temperature gradient 816 on a surface of user-interface device 110. In some embodiments, processor 812 optionally changes a function 818 of electronic device 100 in response to setting 810.

While some of the preceding embodiments illustrated user-interface device and thermal mechanism performing operations in the user-interface technique, in other embodiments at least some of these operations are performed by a processor in electronic device 100 (i.e., at least some of the operations may be performed by software executed by the processor). Furthermore, while the preceding embodiments illustrated electronic and geometric techniques for changing the temperature gradient and/or the user's perception of the temperature gradient, in other embodiments mechanical techniques may be used to achieve either or both of these effects. For example, a mechanical actuator may increase an angle or tilt of the user-interface device so that the user perceives a different temperature gradient over the surface of the user-interface device.

In some embodiments of one or more of the preceding methods, there may be additional or fewer operations. Furthermore, the order of the operations may be changed, and/or two or more operations may be combined into a single operation. In addition, in some of the preceding embodiments there are fewer components, more components, a position of a component is changed and/or two or more components are combined.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:
1. An electronic device, comprising:
a user-interface device having a surface that, during operation, receives a user selectable temperature setting to alter temperature of a temperature controlled environment based on tactile interaction with a user of the electronic device; and
a thermal mechanism, thermally coupled to a portion of the user-interface device, which, during operation, establishes a single temperature gradient on the surface based on the temperature setting and a temperature of the temperature controlled environment that includes the electronic device, wherein, during operation, the thermal mechanism dynamically modifies the temperature gradient so that, as the temperature setting is adjusted by the user to exceed and then progressively increase relative to the temperature of the temperature controlled environment, the thermal mechanism increases the temperature gradient, and, as the temperature setting is adjusted by the user to drop below and then progressively decrease relative to the temperature of the temperature controlled environment, the thermal mechanism decreases the temperature gradient, as user temperature setting input feedback.

2. The electronic device of claim 1, wherein the thermal mechanism includes a heat source that, during operation, increases a temperature of the portion of the user-interface device.

3. The electronic device of claim 2, wherein the thermal mechanism includes a heat sink that, during operation, decreases a temperature of another portion of the user-interface device, which is different that the portion of the user-interface device.

4. The electronic device of claim 1, wherein the thermal mechanism includes a heat sink that, during operation, decreases a temperature of the portion of the user-interface device.

5. The electronic device of claim 1, wherein the user-interface device has a thermal time constant that allows the temperature gradient to be established while the user interacts with the user-interface device.

6. The electronic device of claim 1, wherein the tactile interaction includes changing the temperature setting of the electronic device using the user-interface device.

7. The electronic device of claim 1, wherein the user-interface device includes one of: a touch pad, a multi-touch display, and a knob.

8. The electronic device of claim 1, wherein the electronic device includes a thermostat.

9. The electronic device of claim 1, wherein a thermal impedance of the user-interface device varies over the user-interface device to increase user perception of the temperature gradient.

10. The electronic device of claim 9, wherein the variation in the thermal impedance is associated with different thicknesses of a material in at least one layer in the user-interface device.

11. The electronic device of claim 1, wherein a texture varies over the surface of the user-interface device to increase user perception of the temperature gradient.

12. The electronic device of claim 1, wherein a cross-sectional area of the portion of the user-interface device varies as the user changes the temperature setting using the user-interface device; and wherein the varying cross-sectional area changes a thermal impedance of the portion of the user-interface device to increase user perception of the temperature gradient.

13. The electronic device of claim 1, wherein, at a given time, the thermal mechanism provides a static thermal flux.

14. The electronic device of claim 1, wherein, at a given time during operation, the thermal mechanism establishes the temperature gradient by duty-cycle averaging thermal pulses.

15. The electronic device of claim 1, wherein, during operation, the user-interface device can be rotated about an axis; and wherein a rotational resistance of the user-interface device varies as the user rotates the user-interface device between end rotation positions associated with extrema of temperature settings defined using the user-interface device.

16. The electronic device of claim 15, wherein the rotational resistance varies continuously as the user-interface device is rotated between the end rotation positions.

17. The electronic device of claim 15, wherein the rotational resistance varies when the user-interface device is rotated in proximity to the end rotation positions.

18. The electronic device of claim 15, wherein the rotation resistance is associated with one or more of: an electromagnet, a ferro-magnet, a phase change of a material, a magnetorheological fluid, and a mechanical stop.

19. An electronic device, comprising:
a user-interface device having a surface that, during operation, receives a user selectable temperature setting to alter temperature of a temperature controlled environment based on tactile interaction with a user of the electronic device;
a thermal mechanism, thermally coupled to a portion of the user-interface device, which, during operation, establishes a single temperature gradient on the surface based on the temperature setting and a temperature of the temperature controlled environment that includes the electronic device, wherein, during operation, the thermal mechanism dynamically modifies the temperature gradient so that, as the temperature setting is adjusted by the user to exceed and then progressively increase relative to the temperature of the temperature controlled environment, the thermal mechanism increases the temperature gradient, and, as the temperature setting is adjusted by the user to drop below and then progressively decrease relative to the temperature of the temperature controlled environment, the thermal mechanism decreases the temperature gradient, as user temperature setting input feedback; and
a control circuit, electrically coupled to the user-interface device, which, during operation, modifies a function of the electronic device to alter temperature of the temperature controlled environment based on the received temperature setting.

20. An electronic-device-implemented method for interacting with a user, wherein the method comprises:
receiving a user selectable temperature setting to alter temperature of a temperature controlled environment based on tactile interaction between the user and a surface of a user-interface device in the electronic device; and
using a thermal mechanism in the electronic device to establish a single temperature gradient on the surface based on the temperature setting and a temperature of the temperature controlled environment that includes the electronic device,
wherein the thermal mechanism dynamically modifies the temperature gradient so that, as the temperature setting is adjusted by the user to exceed and then progressively increase relative to the temperature of the temperature controlled environment, the thermal mechanism increases the temperature gradient, and, as the temperature setting is adjusted by the user to drop below and then progressively decrease relative to the temperature of the temperature controlled environment, the thermal mechanism decreases the temperature gradient, as user temperature setting input feedback; and wherein the thermal mechanism includes at least one of: a heat source, and a heat sink.

* * * * *

UNITED STATES PATENT AND TRADEMARK OFFICE
CERTIFICATE OF CORRECTION

PATENT NO. : 9,304,590 B2
APPLICATION NO. : 14/732683
DATED : April 5, 2016
INVENTOR(S) : Nina S. Joshi et al.

Page 1 of 1

It is certified that error appears in the above-identified patent and that said Letters Patent is hereby corrected as shown below:

On the Title Page

On (73) Assignee, delete "Leen, Inc., Palo Alto, CA (US)" and insert --Leeo, Inc., Palo Alto, CA (US)--

Signed and Sealed this
Fourteenth Day of June, 2016

Michelle K. Lee
*Director of the United States Patent and Trademark Office*